Oct. 12, 1965  E. J. SAXL  3,210,994
TENSION GAGE AND CONTROL FOR FILAMENTARY MATERIALS
Filed Oct. 31, 1963  5 Sheets-Sheet 1
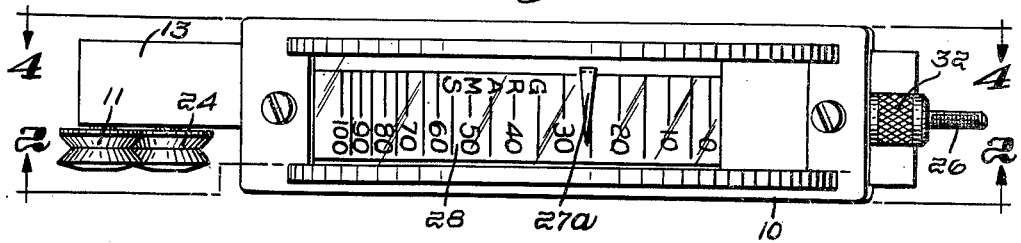
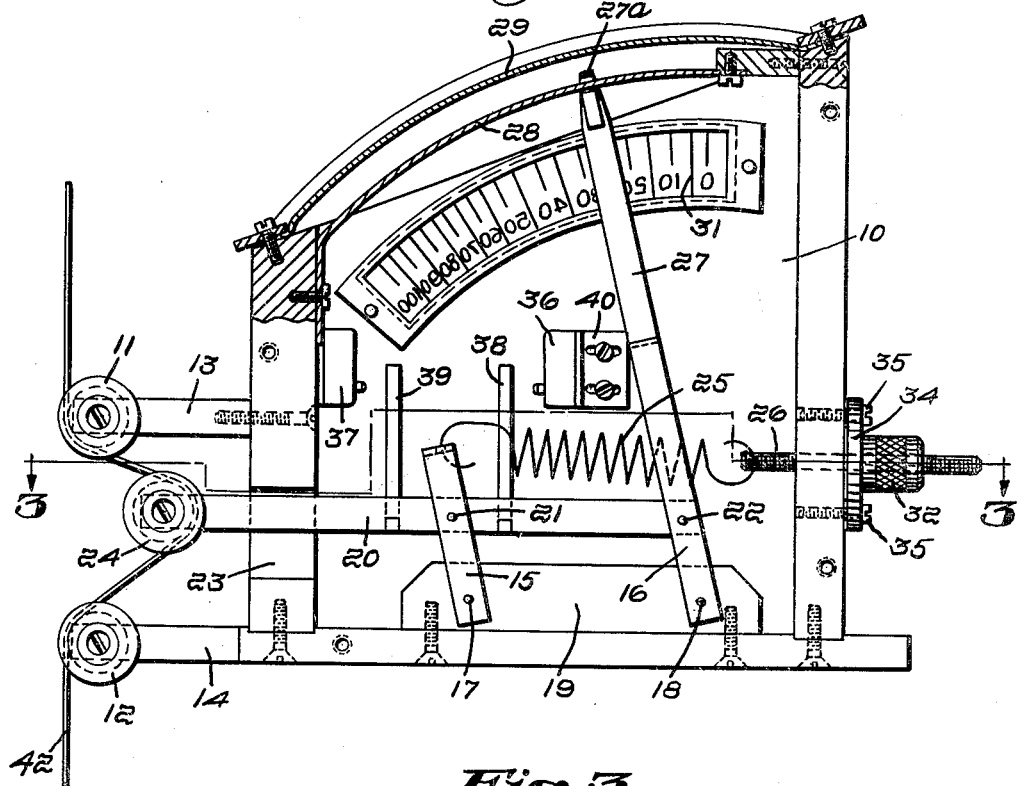
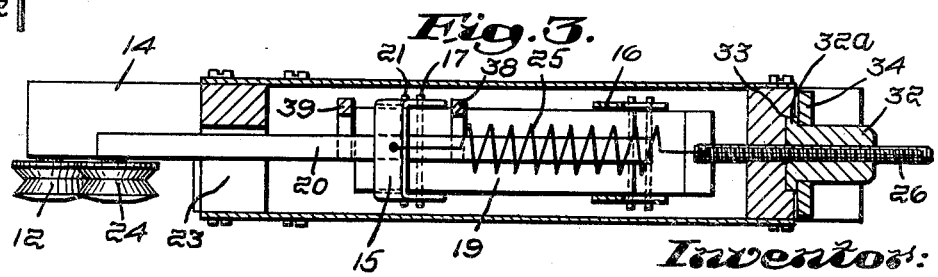
Inventor:
Erwin J. Saxl,
by Arthur D. Thomson
Attorney

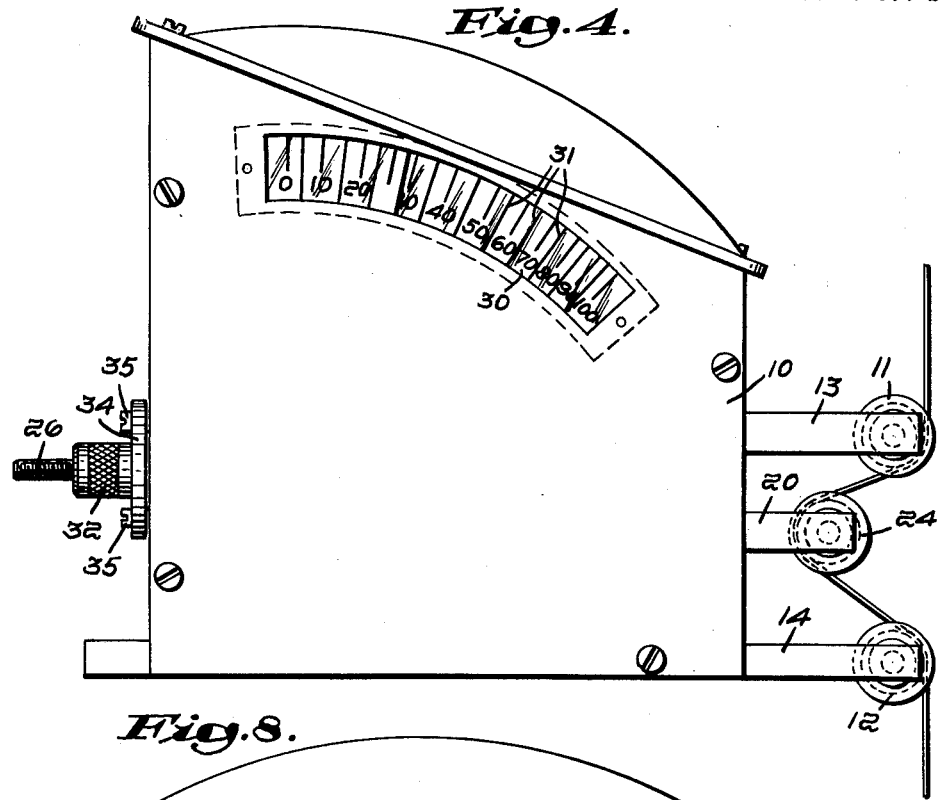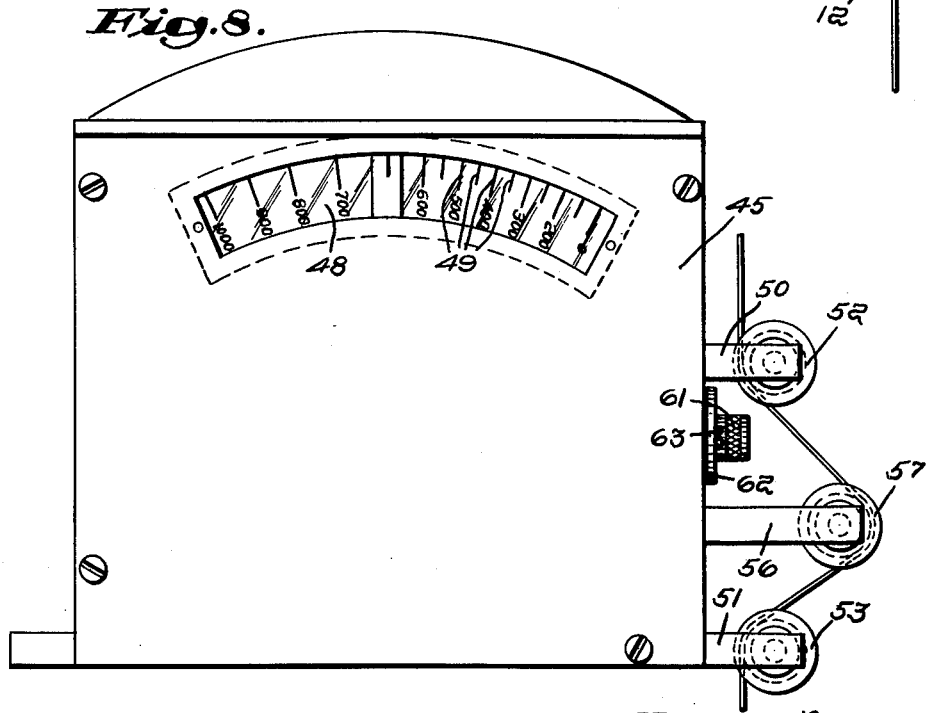

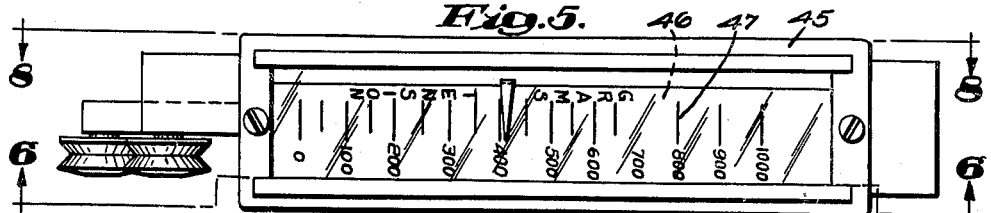
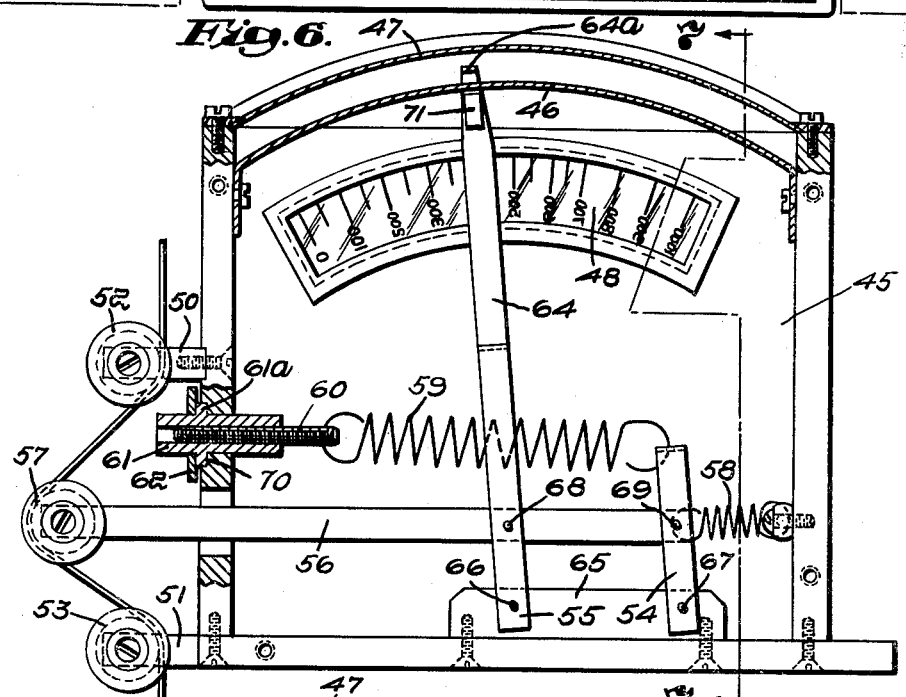
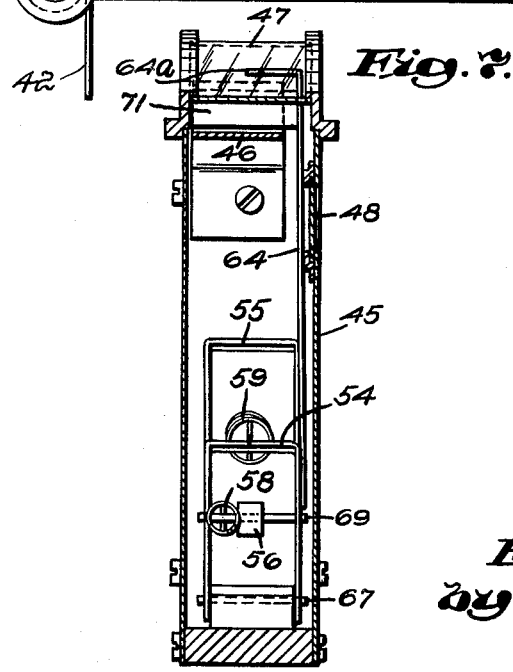

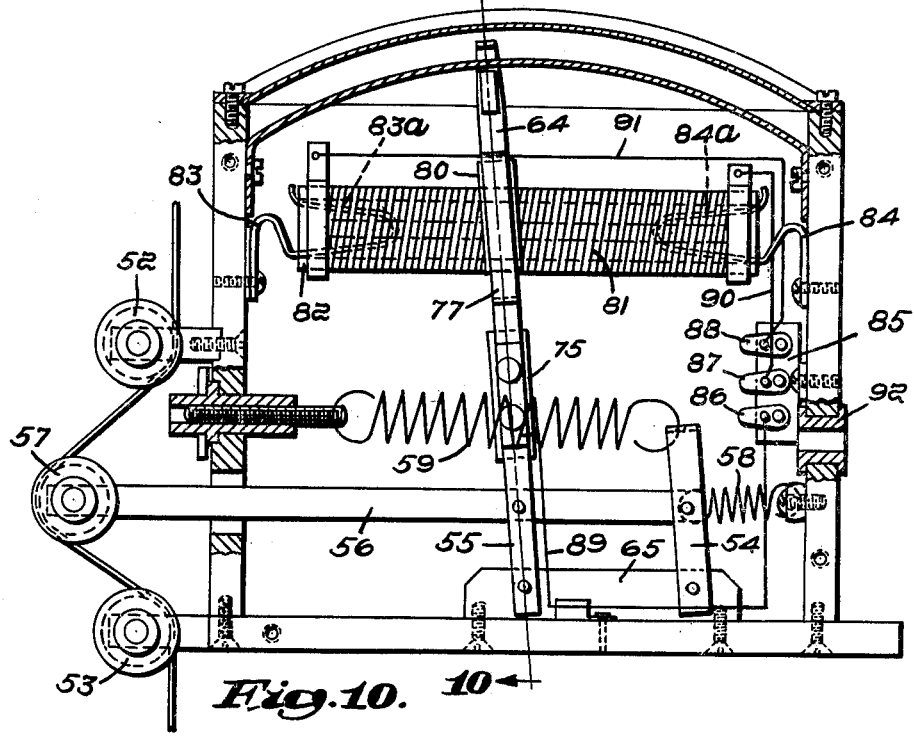
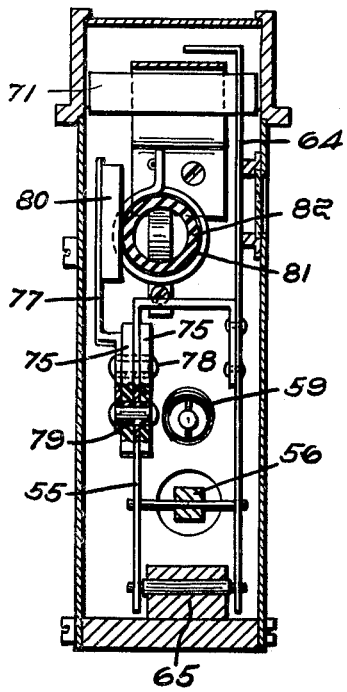
Fig. 9.
Fig. 10.
Inventor:
Erwin J. Saxl,
by Arthur D. Thomson
Attorney Oct. 12, 1965   E. J. SAXL   3,210,994
TENSION GAGE AND CONTROL FOR FILAMENTARY MATERIALS
Filed Oct. 31, 1963   5 Sheets-Sheet 5

Inventor:
Erwin J. Saxl,
by Arthur D. Thomson
Attorney

United States Patent Office 3,210,994
Patented Oct. 12, 1965

3,210,994
TENSION GAGE AND CONTROL FOR
FILAMENTARY MATERIALS
Erwin J. Saxl, Harvard, Mass.
Filed Oct. 31, 1963, Ser. No. 320,267
15 Claims. (Cl. 73—144)

This invention relates to instruments for measuring tension of running or stationary filamentary materials such as yarn, wire, or tape.

In many industrial operations involving fabrication of articles from filamentary materials, for example, textile manufacturing or coil winding, the tension on the filament during the manufacturing operation seriously affects the quality of the finished product.

The principal object of this invention is to provide a simple and inexpensive gage which is adapted both to give a visual indication of the tension in a filament and to actuate automatic control or alarm systems. Another object is to provide a gage which is small and compact enough to permit a number of such gases to be used to monitor tension in banks of filaments, for example, in weaving, knitting and multiple coil winding operations. Still another object is to provide a gage which can be used in various positions and which has a simple and tamperproof device for adjusting the zero setting.

The gage employs as the tension detecting element two stationary rolls adapted to engage the filament and a third movable roll which engages the filament between, and in a position offset from, the stationary rolls. Tension in the filament produces a straightening tendency which results in movement of the movable roll toward the stationary rolls. The movable roll is mounted on an arm connected to a parallel linkage which holds the arm in alignment while permitting motion in a direction perpendicular to the path of the filament. The linkage is restrained by a spring, which opposes the movement produced by tension in the filament, an indicator arm carried by the linkage cooperates with a suitable scale yielding a visual indication of the filament tension. The spring is anchored to a mechanism by which the zero setting may be adjusted, and which includes a locking device for maintaining the setting.

In one form of the gage the linkage operates switches which may be used in connection with an electrical control system to maintain the tension within certain maximum and minimum limits. Another variation of the gage includes a variable resistance which is varied, by movement of the linkage, in proportion to the tension, and can be connected to a tension control or remote reading circuit. Still another form of the gage is especially adapted for use on tape.

Other objects, advantages, and novel features of the invention will be apparent from the following description.

In the drawings illustrating the invention:

FIG. 1 is a front view of one form of tension gage constructed according to the invention;

FIG. 2 is a cross-section taken along line 2—2 of FIG. 1;

FIG. 3 is a cross-section taken along line 3—3 of FIG. 2;

FIG. 4 is a side view taken in the direction of line 4—4 of FIG. 1;

FIG. 5 is a front view of another form of the tension gage;

FIG. 6 is a cross-section taken along line 6—6 of FIG. 5;

FIG. 7 is a cross-section taken along line 7—7 of FIG. 6;

FIG. 8 is a side view taken along line 8—8 of FIG. 5;

FIG. 9 is a side view, with one side wall of the cover removed, of a modification of the gage for use as a detecting element in an electrical system;

FIG. 10 is a cross-section taken along line 10—10 of FIG. 9;

Figure 11:
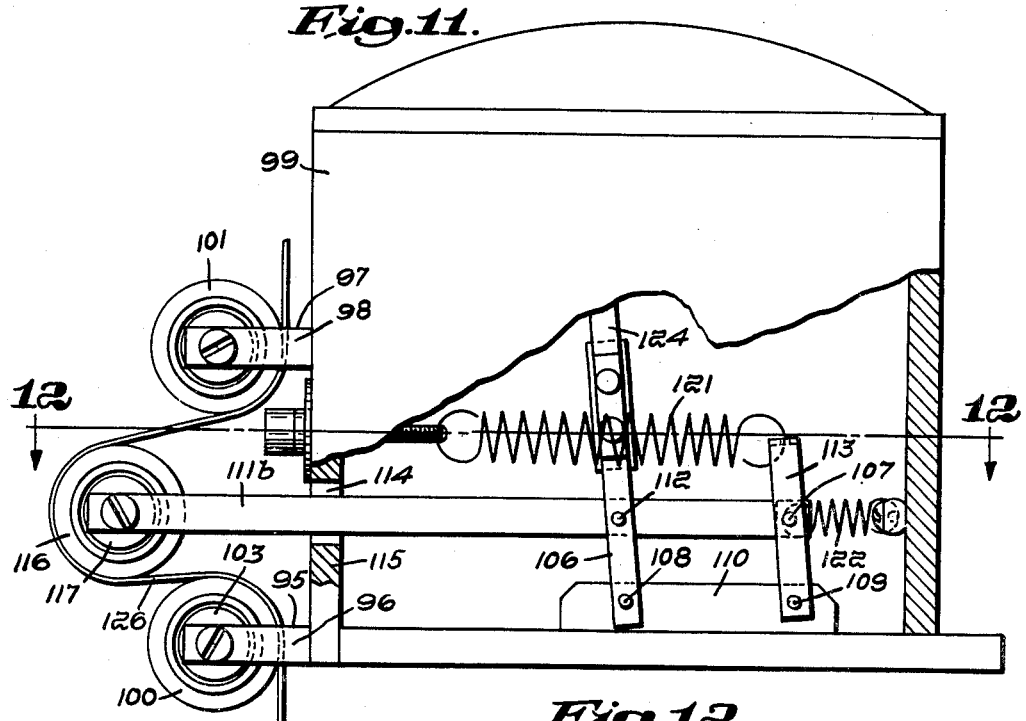
FIG. 11 is a side view, with the side wall of the cover partly broken away, illustrating a modification of the gage for use with tape.

The gage shown in FIGS. 1 to 4 has its moving parts mounted in a casing generally indicated by the numeral 10. A pair of rolls 11 and 12 are rotatably mounted on fixed posts 13 and 14 extending from the casing. A pair of U-shaped parallel arms 15 and 16 are rotatably mounted on pins 17 and 18 passing through a block 19 mounted on the casing.

An arm 20 is connected to pins 21 and 22, and projects through a slot 23 in the casing. This arm carries a roller 24 which is disposed between, and offset from rolls 11 and 12.

A tension spring 25 is connected, at one end, to arm 15 and, at the other end, to a stud 26 mounted on the casing. Arm 16 carries a pointer 27 having an end portion 27a which extends across a scale 28 mounted behind a window 29 in the front of the casing. The scale is marked in suitable gradations for the range of tension in which the gage is intended to operate. A second window 30 is provided in the side of the casing and has similar scale markings 31 so that the gage may be read from the side.

Stud 26 is threaded into a collar 32 having a flange 32a which seats in a recess 33 in the casing. A collar 34 bears on flange 32a and is secured by screws 35. Flange 32a is slightly deeper than recess 33 so that the collar bears on the flange and clamps it when screws 35 are tightened, thus locking sleeve 32 against rotation.

To adjust the zero setting of the gage, screws 35 are loosened, and collar 32 may be turned to draw stud 26 in either direction. When the correct setting has been made screws 35 are again tightened to lock collar 32 in place. The zero setting cannot be tampered with or accidentally disturbed. The zero adjustment permits the gage to be used with the detecting rolls 11, 24, and 12 projecting sideward as illustrated, or hanging downward, or in any intermediate position, as the effect of the weight of the detecting linkage on the zero setting can be compensated for in any of these positions.

For use, the gage may be mounted either permanently or detachably by any suitable means at the desired location. The filament 42 is passed around rolls 11, 24, and 12 in the manner illustrated in FIG. 2, so that the filament is deflected out of its path by roll 24. To facilitate insertion of the filament, the movable roll may be pulled into alignment with the stationary rolls, and allowed to spring back when the filament has been engaged. Tension on the filament causes it to tend to straighten out, resulting in a force on roll 24 in a direction away from the casing. Arm 20 pulls the indicator linkage, consisting of parallel arms 15 and 16, against the force of spring. The scales are so calibrated with respect to the physical characteristics of the spring that indicator arm 27 and the pointer 27a show a reading corresponding to the tension on the filament.

The gage is also provided with a pair of snap switches 36 and 37 mounted on the casing, and arm 20 carries a pair of trip pins 38 and 39 which operate the respective switches at minimum and maximum tension readings. The positions of the switches or trip pins or both may be made adjustable in any suitable manner suggested by the use of a slotted bracket 40, so that the minimum and maximum values at which the switches operate can be changed. The switches may be connected to indicator circuits which give an alarm indication when the filament tension exceeds or falls below the desired operating range. The switches may also be connected in circuits controlling an automatic tension adjustment device.

The gage shown in FIGS. 5 to 8 has a casing, generally indicated by the numeral 45, in which is mounted a scale 46 visible through a window 47. A second window 48, marked with scale indicia 49, is disposed in the side of the casing. Posts 50 and 51 extend from the casing and carry stationary rolls 52 and 53. A pair of parallel U-shaped arms 54 and 55 are rotatably mounted by pins 66 and 67 on a block 65 in the casing. Arm 55 carries an indicator arm 64 and pointer 64a which cooperate with scales 49 and 46. An arm 56 is rotatably connected to arms 54 and 55 by pins 68 and 69, and carries a roll 57 offset from, and disposed between, rolls 52 and 53.

A tension spring 58 is secured to arm 54 by pin 69 and is anchored on the wall of the casing opposite that along which the rolls are disposed. A second tension spring 59 is attached to arm 54 and extends in a direction opposite to spring 58.

Spring 59 is connected to a stud 60 which is threaded into a sleeve 61 extending through the wall of the casing. Sleeve 61 carries a flange 61a which seats in a recess 70 of shallower depth than the flange. A collar 62 surrounds sleeve 61 and bears on the flange 61a, and is secured by screws 63. As in the first form of gage, the zero setting may be adjusted by loosening screws 63 and turning sleeve 61. When the correct setting has been made, screws 63 are tightened to lock the collar in place.

With this form of gage the movable roll 57 is offset from the stationary rolls in the direction away from the casing. The filament 42 is passed around the rolls as shown in FIG. 6, and tension on the filament causes movement of roll 57, along with the associated indicating linkage in the direction toward the casing, against the tension of spring 59.

The second type of gage can be used in any position, for example, with the rolls at the top if it is more convenient in a particular installation to run the filament overhead. When the gage is mounted with the rolls hanging down, the weight of the linkage is supported by spring 58, so that the filament is not stressed or deflected excessively. This is important, for example, in the case of delicate yarns which might not be able to sustain the linkage weight, or coated wires which would be damaged by excessive bending. Spring 58 is of such length that a small amount of tension must be applied by spring 59 to bring the indicator arm to the zero position.

The gage shown in FIGS. 9 and 10 employ the basic construction of the form shown is FIGS. 5 through 8. A pair of insulating blocks 75 and 76 are mounted one on either side of arm 55, and a bracket 77 of conductive material is mounted on block 75. The bracket and blocks are secured to arm 55 by rivets 78 insulated from the arm by sleeves 79. A brush 80 of carbon or other suitable material is mounted on bracket 77 and slidably engages a wire wound resistor 81.

The resistor is wound on a tubular body 82. A pair of spring clips 83 and 84 are mounted on the casing and have re-entrant portions 82a and 83a engaged inside opposite ends of body 82. A terminal board 85 is mounted on the casing and carries three terminals 86, 87, and 88. These terminals are connected by wires 89, 90 and 91, respectively, to bracket 77 and thus brush 80, and to opposite ends of the resistor 81. A grommet 92, through which a connecting cable may be led in, is mounted in the casing.

With the additions just described, the gage becomes a variable resistance tension detecting element which may be connected in a circuit for actuating a tension control device. It is understood that a similar brush and resistor and associated connector may be installed in a gage of the form shown in FIGS. 1 through 4.

Figure 12:
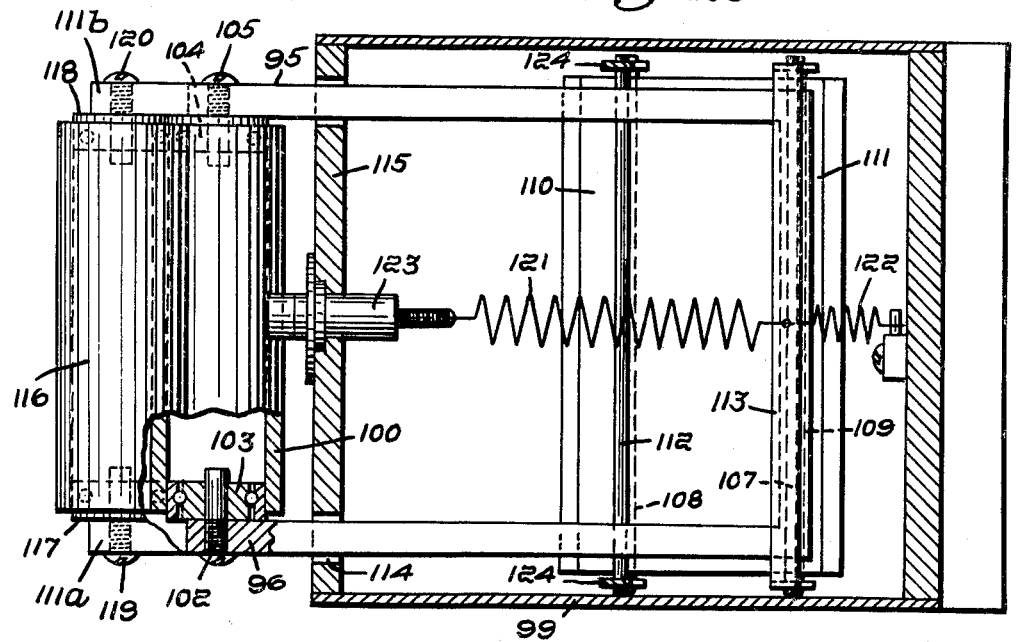
FIG. 12 is a view, taken in the direction of line 12—12 of the gage of FIG. 11 with the back cover removed.

The gage shown in FIGS. 11 and 12 operates in substantially the same manner as that shown in FIGS. 5 through 8 but is especially adapted for handling wide tapes. Two pairs of posts 95, 96 and 97, 98 are mounted in a casing 99. These posts support elongated tubular rolls 100 and 101. As shown in FIG. 12, a ball bearing 102 is pressed into one end of roll 101 and engaged by a pin 103 threaded into post 98. The other end of roll 101 is mounted on a ball bearing 104 engaged by a pin 105 threaded into post 97. Roll 100 is mounted in the same manner.

A pair of U-shaped parallel arms 106 and 107 are rotatably mounted by means of pins 108 and 109 on a block 110 on the casing. A U-shaped yoke 111 is rotatably connected to these arms by pins 112 and 113, and has legs 111a and 111b extending through slots 114 and 115 in the casing. A tubular roll 116 is carried by legs 111a and 111b, and is mounted in the same manner as rolls 100 and 101, on ball bearings 117 and 118 removably secured to the legs by pins 119 and 120.

The linkage for the movable roll 116, consisting of arms 112 and 113 and yoke 111, is restrained in one direction by a spring 121 and in the other direction by a spring 122. Spring 121 is anchored to a device for adjusting the zero setting, generally indicated by the numeral 123. Arm 112 carries an indicator arm 124 which indicates the tension on a scale 125. This type of gage may also be equipped with limit switches or a variable resistor, of the types previously described, to actuate control or remote reading devices.

The gages previously described can be used with tape by installing wider rolls, but the width is limited because the cantilever arrangement of the roll results in a tilting or twisting force on the detecting linkage which will impair accuracy if the center of application of force on the rolls is offset too far. The construction shown in FIGS. 11 and 12 overcomes this difficulty, as the rolls are supported at both ends and the distribution of load on the linkage is symmetrical. The tape 126 is passed around the rolls as shown in FIG. 11 and the gage operates in essentially the same manner as that of FIGS. 5 through 8. If it is necessary to apply the gage to a tape or film without cutting it, the rolls 100, 101 and 116 can be readily removed by taking out their supporting pins, and replaced in the proper relationship with the tape. This gage, like the others, can be equipped with limit switches or a variable resistor for use as a control.

Gages of this type are very simple in construction and most of the parts used in the two types are interchangeable, so that the gages can be manufactured inexpensively. The gages are reliable and durable as they do not employ any delicate gearing or other mechanism which might be adversely affected by dust and lint. The compact detecting mechanism permits the use of narrow flatside casings, so that banks of gages can be mounted side by side to monitor banks of filaments.

It is understood that restraining springs of various degrees of stiffness, and suitably calibrated scales may be used to adapt the gages for various ranges of tension. Other filament engaging elements, such as pins may be substituted for the rolls here illustrated. The gages may be used on single or multiple strand yarns and wires, rovings, tapes film and many other types of filament-like or tape-like materials and the term "filament," as here employed is intended to include all such materials.

What is claimed is:

1. A tension gage for filamentary materials comprising a first and a second filament engaging member disposed in stationary spaced relationship along a straight path, a third filament engaging member disposed between said first and second members, an arm on which said third member is mounted, a linkage including a pair of parallel links mounted to rotate about a pair of fixed points and rotatably connected to said arm, said linkage being adapted to permit movement of said arm transversely with respect to said path, a spring connected to said linkage and urging said third member toward a position offset from said path, and tension indicating means operated by movement of said linkage.

2. A tension gage as described in claim 1 including an anchoring member to which said spring is attached, and means for adjusting the position of said anchoring member.

3. A tension gage as described in claim 1 including an anchoring member to which said spring is attached, means for adjusting the position of said anchoring member, and means for releasably locking said anchoring member in adjusted position.

4. A tension gage as described in claim 1 having a pair of switches mounted adjacent said linkage, and means carried by said linkage for operating said switches at positions of said linkage corresponding to predetermined minimum and maximum tension values.

5. A tension gage as described in claim 1, said tension indicating means comprising an indicator arm carried by said linkage and a scale adjacent said indicator arm.

6. A tension gage for filamentary materials comprising a casing, a first and a second filament engaging member supported on said casing in fixed spaced relationship along a straight path, an arm disposed substantially transversely to said path intermediate said members, a linkage including a pair of parallel links mounted to rotate about a pair of fixed points on said casing and rotatably connected to said arm, said linkage being adapted to permit movement of said arm transversely with respect to said path, a third filament engaging member mounted on said arm, a spring connected to said linkage and urging said third member toward a position offset from said path, tension indicating means operated by movement of said linkage, a threaded anchoring stud to which said spring is connected, a sleeve threadably engaging said stud and having a flange bearing on said casing, and a collar bearing on said flange, and means for selectively drawing said collar toward and away from said casing to clamp and release said collar.

7. A tension gage as described in claim 6, said casing having a recess of lesser depth than said flange, in which said flange is received.

8. A tension gage for filamentary materials comprising a casing, a first and a second filament engaging member supported on said casing in fixed spaced relationship along a straight path, an arm disposed substantially transversely to said path intermediate said members, a linkage including a pair of parallel links mounted to rotate about a pair of fixed points on said casing and rotatably connected to said arm, said linkage being adapted to permit movement of said arm transversely with respect to said path, a third filament engaging member mounted on said arm in a position offset from said path in a direction toward said casing, a tension spring anchored on said casing and connected to said linkage and urging said third member toward said casing, and tension indicating means operated by movement of said linkage.

9. A tension gage for filamentary materials comprising a casing, a first and a second filament engaging member supported on said casing in fixed spaced relationship along a straight path, an arm disposed substantially transversely to said path intermediate said members, a linkage including a pair of parallel links mounted to rotate about a pair of fixed points on said casing and rotatably connected to said arm, said linkage being adapted to permit movement of said arm transversely with respect to said path, a third filament engaging member mounted on said arm in a position offset from said path in a direction away from said casing, a first tension spring anchored on said casing and connected to said linkage and urging said third member away from said casing, a second tension spring anchored on said casing and connected to said linkage and adapted to urge said third member toward said casing, and tension indicating means operated by movement of said linkage.

10. A tension detecting device for filamentary materials comprising a first and a second filament engaging member disposed in stationary spaced relationship along a straight path, a third filament engaging member disposed between said first and second members, an arm on which said third member is mounted, a linkage including a pair of parallel links mounted to rotate about a pair of fixed points and rotatably connected to said arm, said linkage being adapted to permit movement of said arm transversely with respect to said path, a spring connected to said linkage and urging said third member toward a position off-set from said path, a contact member carried by said linkage to move in unison with said arm a resistor slidably engaged by said contact member, and means for making electrical connections to said resistor and to said contact member.

11. A tension detecting device as described in claim 10 having a conductive bracket mounted on one of said links and electrically insulated therefrom, said contact member being mounted on said bracket.

12. A tension gage for filamentary materials comprising a first and a second filament engaging member disposed in stationary spaced relationship along a straight path, a third filament engaging member disposed between and offset from said path, an arm disposed substantially transversely to said path, said third member being supported solely by said arm, a linkage including a pair of parallel link mounted to rotate about a pair of fixed points and rotatably connected to said arm, said linkage being adapted to permit movement of said arm transversely with respect to said path, a spring connected to said linkage and urging said third member away from said path, and a tension indicating device operated by movement of said linkage.

13. A tension gage for filamentary materials comprising a first and a second filament engaging member disposed in stationary spaced relationship along a straight path, a yoke having a pair of spaced legs, an elongated cylindrical roller rotatably mounted on said legs, a linkage including a pair of parallel links mounted to rotate about a pair of fixed points and rotatably connected to said yoke, said linkage being adapted to permit movement of said yoke and roller transversely with respect to said path, a spring connected to said linkage and urging said roller to a position offset from said path, and a tension indicating device operated by said linkage.

14. A tension gage as described in claim 13, having a pair of bearings one removably secured to each of said legs, said roller being mounted on said bearings.

15. A tension gage as described in claim 13 including spaced pairs of end supports, said first and second filament engaging members comprising elongated cylindrical rollers mounted one on each pair of said end supports.

References Cited by the Examiner
UNITED STATES PATENTS

| | | | |
|---|---|---|---|
| 2,008,618 | 7/35 | Lefebvre | 73—144 X |
| 2,588,322 | 3/52 | Herbst | 177—225 X |
| 2,591,724 | 4/52 | Saxl | 73—144 |

RICHARD C. QUEISSER, *Primary Examiner.*